US011467801B2

(12) United States Patent
Nishiguchi (10) Patent No.: US 11,467,801 B2
(45) Date of Patent: Oct. 11, 2022

(54) TERMINAL DEVICE AND CONTROL METHOD

(71) Applicant: JVCKENWOOD Corporation, Yokohama (JP)

(72) Inventor: Koki Nishiguchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 15 days.

(21) Appl. No.: 17/202,391

(22) Filed: Mar. 16, 2021

(65) Prior Publication Data
US 2021/0303257 A1  Sep. 30, 2021

(30) Foreign Application Priority Data

Mar. 24, 2020 (JP) .............................. JP2020-052340

(51) Int. Cl.
*G06F 3/16* (2006.01)
*H04B 17/27* (2015.01)
*H04B 17/318* (2015.01)

(52) U.S. Cl.
CPC .............. *G06F 3/165* (2013.01); *H04B 17/27* (2015.01); *H04B 17/318* (2015.01)

(58) Field of Classification Search
CPC ........ G06F 3/165; H04B 17/27; H04B 17/318
See application file for complete search history.

(56) References Cited

U.S. PATENT DOCUMENTS

| 6,952,471 | B1 * | 10/2005 | Cannon | H04M 1/72502 |
| | | | | 379/390.01 |
| 9,667,284 | B1 * | 5/2017 | Gean | H04W 4/023 |
| 10,154,149 | B1 * | 12/2018 | Gean | H04M 9/082 |
| 10,284,728 | B1 * | 5/2019 | Gean | H04R 29/001 |
| 2016/0094960 | A1 * | 3/2016 | Wong | H04W 4/80 |
| | | | | 370/277 |

FOREIGN PATENT DOCUMENTS

JP    2014-143534    8/2014

* cited by examiner

*Primary Examiner* — Joseph Saunders, Jr.
(74) *Attorney, Agent, or Firm* — Amin, Turocy & Watson, LLP (57) ABSTRACT

A terminal device includes: a first communicator that carries out short-distance radio communications with a terminal device; a second communicator that carries out long-distance radio communications with the terminal device; a detector that detects an identifier, for identifying the terminal device, from a reception signal received by the first communicator; a determiner that determines signal strength of the reception signal detected by the detector; a storage that stores information relating to the terminal device and the signal strength; a storage controller that exercises such control that the identifier and the signal strength are correlated with each other and stored in the storage as a proximity station list; a setter; and an output controller.

5 Claims, 7 Drawing Sheets

| TERMINAL ID | SIGNAL STRENGTH [dBm] |
|---|---|
| 1 | -92 |
| 3 | -105 |
| 4 | -88 |

FIG.4

| DISTANCE | SIGNAL STRENGTH [dBm] | VOLUME UPPER LIMIT |
|---|---|---|
| LESS THAN 3 M | -80 OR GREATER | 3 |
| 3 TO 5 M | -80 TO -90 | 6 |
| 5 TO 10 M | -90 TO -100 | 8 |
| 10 M OR GREATER | -100 OR LESS | 10 |

TERMINAL DEVICE AND CONTROL METHOD

CROSS-REFERENCE TO RELATED APPLICATIONS

This application claims priority from Japanese Application No. 2020-052340, filed on Mar. 24, 2020, the contents of which are incorporated by reference herein in its entirety.

BACKGROUND

1. Technical Field

The present disclosure relates to a terminal device and a control method.

2. Description of the Related Art

Regarding communication devices enabling voice calls, a microphone of a sending communication device picks up sound output from a speaker of a receiving communication device, causing a howl to occur in some cases.

For example, Japanese Patent Application Laid-open No. 2014-143534 discloses a technique in which, when one transmission terminal is located at a distance equal to or less than a predetermined threshold from another transmission terminal and when the other transmission terminal receives sound data from the one transmission terminal, muting sound output from the other transmission terminal reduces howls.

With the technique of Japanese Patent Application Laid-open No. 2014-143534, since sound is not output from the other transmission terminal, the user of the other transmission terminal may not clearly hear sound.

SUMMARY

It is an object of the present disclosure to at least partially solve the problems in the conventional technology.

A terminal device according to an embodiment of the present disclosure includes a first communicator configured to carry out short-distance radio communications with a terminal device, a second communicator configured to carry out long-distance radio communications with the terminal device, a detector configured to detect an identifier from a reception signal received by the first communicator, the identifier being used for identifying the terminal device, a determiner configured to determine signal strength of the reception signal detected by the detector, a storage configured to store information relating to the terminal device and the signal strength, a storage controller configured to exercise such control that the identifier and the signal strength are correlated with each other and stored in the storage as a proximity station list, a setter configured to, upon reception of a voice call signal at the second communicator and upon determination that an identifier of a terminal device serving as a sender of the voice call signal is contained in the proximity station list stored in the storage, set a volume upper limit of output sound of the voice call signal depending on the signal strength correlated with the identifier contained in the proximity station list, the output sound being output from a speaker, and an output controller configured to exercise such control that volume of the output sound of the voice call signal does not exceed the volume upper limit.

A control method according to an embodiment of the present disclosure includes detecting an identifier from a reception signal received from a terminal device, the identifier being used for identifying the terminal device, determining signal strength of the reception signal received from the terminal device, correlating the determined signal strength with the identifier and storing the determined signal strength and the identifier as a proximity station list, upon reception of a voice call signal and upon determination that an identifier of a terminal device serving as a sender of the voice call signal is contained in the proximity station list, setting a volume upper limit of output sound of the voice call signal depending on the signal strength correlated with the identifier contained in the proximity station list, the output sound being output from a speaker, and exercising such control that volume of the output sound of the voice call signal does not exceed the volume upper limit.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

An embodiment according to the present disclosure will now be described in detail with reference to the attached drawings. Note that the embodiment should not be construed to limit the present disclosure and that a plurality of embodiments include a combination of the embodiments. In the following embodiments, the same constituents will be given the same reference signs, and overlapping descriptions will thus be omitted.

Radio Communication System

Figure 1:
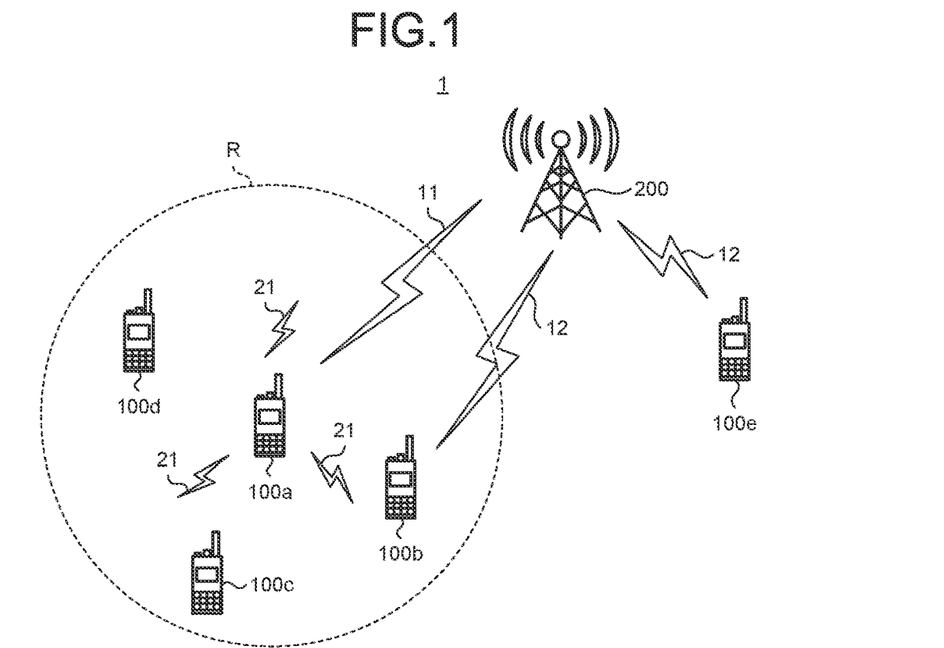
FIG. 1 is a diagram for describing an example configuration of a radio communication system according to an embodiment.

With reference to FIG. 1, a configuration of a radio communication system according to an embodiment of the present disclosure will be described. FIG. 1 is a diagram illustrating an example configuration of the radio communication system according to the embodiment of the present disclosure.

As illustrated in FIG. 1, a radio communication system 1 includes a terminal device 100a, a terminal device 100b, a terminal device 100c, a terminal device 100d, a terminal device 100e, and a base station device 200. The terminal devices 100a to 100e communicate with each other via the base station device 200. The terminal devices 100a to 100e make a voice call with each other via the base station device 200. The terminal devices 100a to 100e make a group call together via the base station device 200. When not needed to be distinguished from each other, the terminal devices 100a to 100e may be referred to as terminal devices 100. The terminal devices 100a to 100e may also be referred to simply as terminal devices.

In the example illustrated in FIG. 1, the terminal device 100a serves as a sending station. The terminal devices 100a to 100e are registered to a group making a group call. When making a group call, the terminal devices 100a to 100e send a voice call signal 11 to the base station device 200. The base station device 200 sends a voice call signal 12 corresponding to the voice call signal 11 to the terminal devices 100b to 100e serving as participants of the group call, for example. The terminal devices 100b to 100e then receive the voice call signal 12 and thus output sound relating to the voice call signal 11.

The terminal device 100a sends the voice call signal 11 and broadcasts a proximity notification signal 21 to the surroundings. The proximity notification signal 21 is a short-distance radio signal containing identification (ID) serving as an identifier for identifying the terminal device 100a. The terminal device 100a continues sending the proximity notification signal 21 while continuing sending the voice call signal 11, and ends the sending of the proximity notification signal 21 when ending the sending of the voice call signal 11. The proximity notification signal 21 reaches within a reachable range R of, for example, approximately 10 m; however, no such limitation is intended. In the example illustrated in FIG. 1, the terminal devices 100b to 100d making the group call together with the terminal device 100a are located in the reachable range R, and the terminal device 100e is located outside the reachable range R. In this case, the terminal devices 100b to 100d receive the proximity notification signal 21. In contrast, the terminal device 100e does not receive the proximity notification signal 21.

In the present embodiment, depending on whether the terminal device 100 serving as a receiving station receiving the voice call signal 12 is located in the reachable range R, the volume of output sound is controlled. In specific, when the terminal device 100 is located in the reachable range R, the volume of output sound is controlled so as to be low on the basis of signal strength of the received proximity notification signal 21 (reception signal). In the present embodiment, by lowering the volume of output sound on the basis of the signal strength of the received proximity notification signal 21, howls can be prevented.

Configuration of Terminal Device

Figure 2:
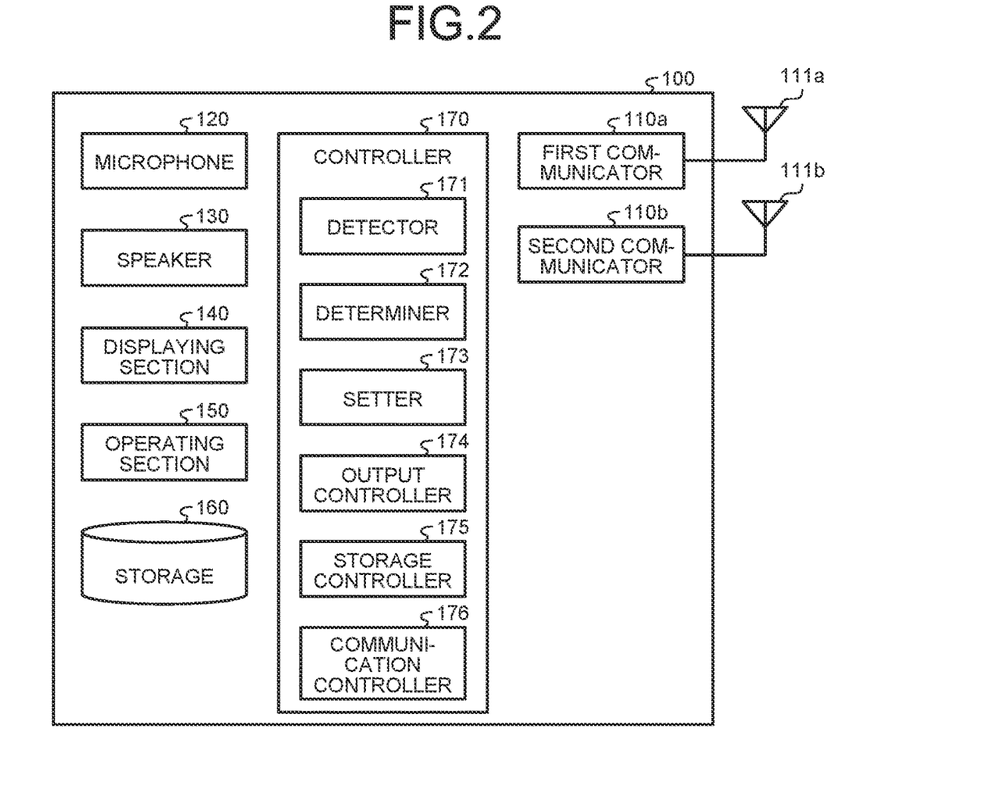
FIG. 2 is a block diagram illustrating an example configuration of a terminal device according to the embodiment.

With reference to FIG. 2, a configuration of the terminal device according to the embodiment will be described. FIG. 2 is a block diagram illustrating an example configuration of the terminal device according to the embodiment.

As illustrated in FIG. 2, the terminal device 100 includes a first communicator 110a, a second communicator 110b, a microphone 120, a speaker 130, a displaying section 140, an operating section 150, a storage 160, and a controller 170.

The first communicator 110a is a short-distance radio communicator having a function of carrying out short-distance radio communications. The first communicator 110a broadcasts a proximity notification signal containing an identifier (ID) of the terminal device 100 via a first antenna 111a through short-distance radio communications. The first communicator 110a receives a proximity notification signal containing an ID of another terminal device from the other terminal device via the first antenna 111a through short-distance radio communications. Methods of short-distance radio communications include, but are not particularly limited to, Bluetooth (registered trademark) and a wireless local area network (LAN), for example.

The second communicator 110b is a long-distance radio communicator having a function of carrying out long-distance radio communications. The second communicator 110b carries out long-distance radio communications via a second antenna 111b. Signals for long-distance radio communications typically have a larger reachable range than that of signals for short-distance radio communications. Examples of long-distance radio communications include digital land mobile radio systems, such as Association of Public Safety Communications Officials International Project 25 (APCO-P25) and NXDN (registered trademark). Long-distance radio communications may be communications using a mobile telephone network or the like.

The microphone 120 collects sound in the vicinity of the terminal device 100. The microphone 120 collects, for example, voice of a user and converts the voice into an electric signal. The microphone 120 outputs, to the controller 170, the voice converted into the electric signal as a voice call signal. The speaker 130 outputs various pieces of sound. The speaker 130 outputs a sound signal received from another terminal device 100 as sound, for example.

The displaying section 140 displays various pieces of information. The displaying section 140 displays, for example, a state of the terminal device 100, a communication state, and the like. The displaying section 140 includes, for example, a display including a liquid crystal display (LCD), an organic electro-luminescence (EL) display, and the like.

The operating section 150 receives various operations performed by the user to the terminal device 100. The operating section 150 includes, for example, a physical switch or the like. The operating section 150 receives, for example, an operation for setting the volume of sound output from the speaker 130. The operating section 150 includes, for example, a push-to-talk (PTT) button for performing PTT. In the present embodiment, a push of the PTT button allows the first antenna 111a to send the proximity notification signal and the second antenna 111b to send the voice call signal. The operating section 150 may include a touch panel disposed at the displaying section 140. In other words, the operating section 150 and the displaying section 140 may be integrally formed.

The storage 160 includes a semiconductor memory, a solid state drive (SSD), a hard disk drive (HDD), or the like, and stores various pieces of data.

The controller 170 is provided, for example, in such a manner that a central processing unit (CPU), a micro processing unit (MPU), or the like executes a computer program (for example, an information processing computer program relating to the present disclosure) stored in a storage, which is not illustrated, with RAM or the like serving as a workspace. The controller 170 may be provided, for example, using an integrated circuit, such as an application specific integrated circuit (ASIC) and a field programmable gate array (FPGA). The controller 170 may be provided by combining hardware and software.

The controller 170 includes a detector 171, a determiner 172, a setter 173, an output controller 174, a storage controller 175, and a communication controller 176.

The detector 171 detects various signals. The detector 171 detects the proximity notification signal received by the first communicator 110a and the ID of the other terminal device contained in the proximity notification signal.

The determiner 172 determines signal strength (dBm) of the proximity notification signal detected by the detector 171. The storage controller 175 correlates the ID of the terminal device serving as the sender of the proximity notification signal with the signal strength and stores the ID and the signal strength as a proximity station list in the storage 160. That is, the proximity station list is a list stored in the storage 160 of the receiving terminal device 100.

Figure 3:
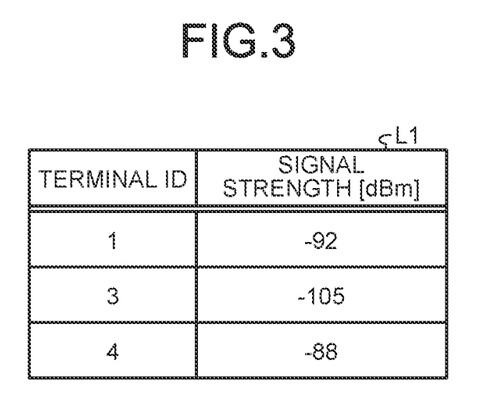
FIG. 3 is a diagram for describing an example proximity station list.

FIG. 3 is a diagram illustrating an example proximity station list. The proximity station list L1 illustrated in FIG. 3 has items including "Terminal ID" and "Signal Strength (dBm)".

The "Terminal ID" indicates an ID for identifying another terminal device and is also referred to as an "ID of a terminal device". The "Signal Strength (dBm)" indicates signal strength of a proximity notification signal. The "Signal Strength (dBm)" increases as the distance to the other terminal device is shorter and decreases as the distance is longer. The proximity station list L1 is, for example, a proximity station list stored in the terminal device having Terminal ID 2. In the proximity station list L1, the terminal device having Terminal ID 1 has a signal strength of −92 dBm. The terminal device having Terminal Device ID 3 has a signal strength of −105 dBm. The terminal device having Terminal Device ID 4 has a signal strength of −88 dBm.

Refer to FIG. 2 again. The setter 173 sets the volume of sound output from the speaker 130. The setter 173 sets the volume of sound output from the speaker 130 on the basis of the signal strength determined by the determiner 172. In specific, when the terminal device 100 receives a voice call signal from another terminal device, the setter 173 determines whether the ID of the other terminal device is contained in the proximity station list L1. When determining that the ID of the other terminal device is contained in the proximity station list L1, the setter 173 sets the volume of sound output from the speaker 130 depending on the signal strength correlated with the ID. For example, the setter 173 sets the volume of the output sound in accordance with a volume setting table in which the signal strength of a proximity notification signal is correlated with the volume of output sound.

Figure 4:
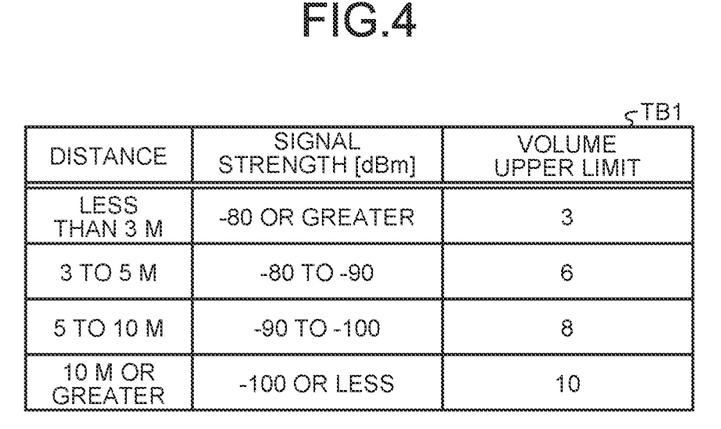
FIG. 4 is a diagram for describing an example volume setting table.

FIG. 4 is a diagram for describing an example volume setting table. The volume setting table TB1 illustrated in FIG. 4 has items including "Distance", "Signal Strength (dBm)", and "Volume Upper Limit".

The "Distance" indicates a distance from the terminal device 100 to a terminal device that has sent a proximity notification signal. The "Volume Upper Limit" indicates an upper limit of the volume of sound output from the speaker 130. The volume upper limit has, for example, ten settings, 1, 2, 3, 4, 5, 6, 7, 8, 9, and 10. In the present embodiment, the upper limit of the volume is lowest at the setting 1 and highest at the setting 10. That is, the setter 173 makes stepwise settings of the volume of sound output from the speaker 130. The setter 173 sets the upper limit of sound output from the speaker 130.

In the volume setting table TB1, the distance is calculated on the basis of the signal strength. When the signal strength is "−80 dBm or greater" (signal strength with the distance being "less than 3 m"), the volume upper limit is "3". When the signal strength is "−80 to −90 dBm" (signal strength with the distance being "3 to 5 m"), the volume upper limit is "6". When the signal strength is "−90 to −100 dBm" (signal strength with the distance being "5 to 10 m"), the volume upper limit is "8". When the distance is "10 m or greater" and the signal strength is "−100 dBm or less" (signal strength with the distance being "10 m or greater"), the volume upper limit is "10".

The volume upper limit listed in the volume setting table TB1 indicates a volume upper limit at and below which sound is not collected by the microphone 120 of the terminal device 100 serving as the sending station. For example, a distance of "less than 3 m" to the terminal device 100 serving as the sending station indicates that, with the volume set to "3" or below, sound output from the speaker 130 is not collected by the microphone 120 of the terminal device 100 serving as the sending station. That is, in the present embodiment, the upper limit of the volume of sound output from the speaker 130 of the terminal device 100 serving as a receiving station is set so that the sound is not collected by the microphone 120 of the terminal device 100 serving as a sending station, resulting in reduction of howls.

With reference to FIG. 5A, FIG. 5B, FIG. 5C, and FIG. 5D, changes in the volume upper limit according to the embodiment will be described. FIG. 5A to FIG. 5D are diagrams for describing changes in the volume upper limit according to the embodiment. In FIG. 5A to FIG. 5D, the horizontal axes represent volume settings, and the vertical axes represent gains (dB).

Figure 5A:
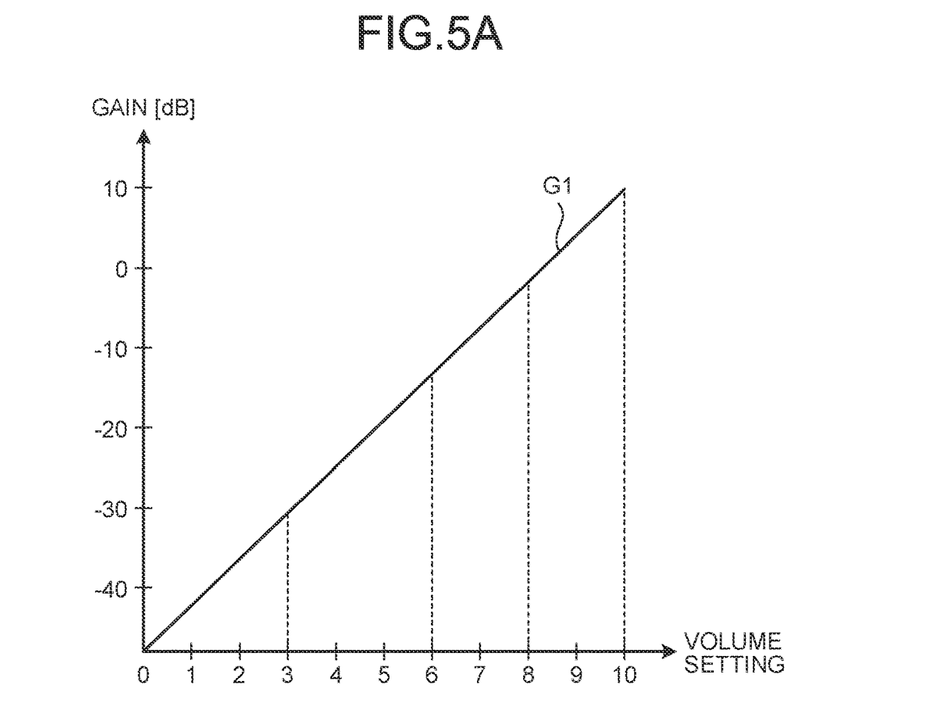
FIG. 5A is a diagram for describing changes in a volume upper limit according to the embodiment.

FIG. 5A is a graph G1 illustrating changes in the volume when the setter 173 sets the volume upper limit at "10". That is, when it is determined that the signal strength is "−100 dBm or less", the upper limit of the volume is changed between "0" and "10" inclusive in response to setting made by the user as illustrated in the graph G1.

Figure 5B:
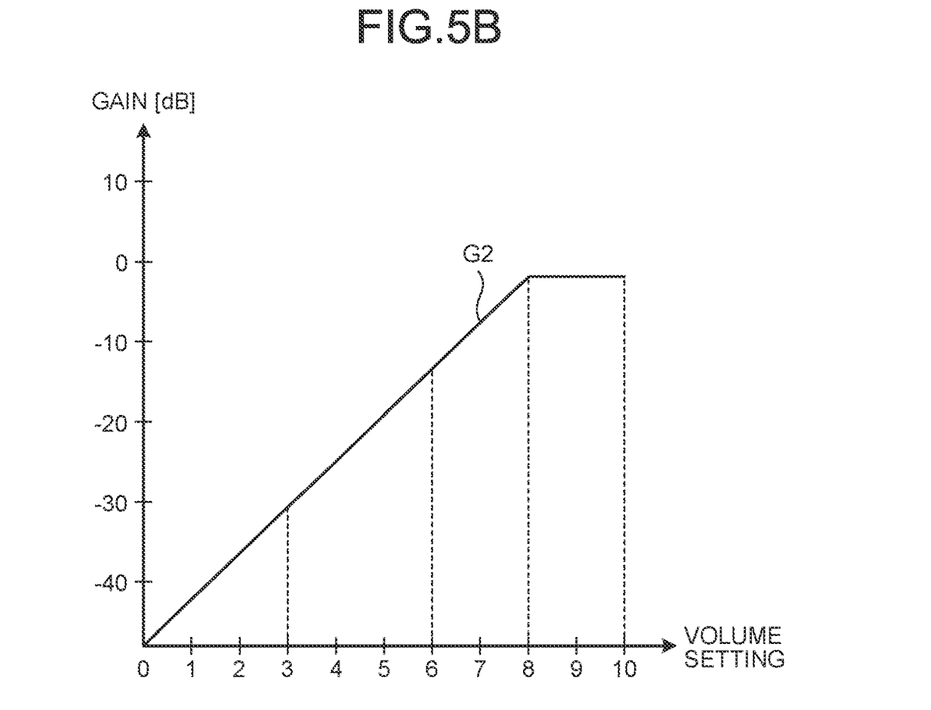
FIG. 5B is a diagram for describing changes in the volume upper limit according to the embodiment.

FIG. 5B is a graph G2 illustrating changes in the volume when the setter 173 sets the volume upper limit at "8". That is, when it is determined that the signal strength is "−90 to −100 dBm", the upper limit of the volume is changed between "0" and "8" inclusive as illustrated in the graph G2. If the user sets the upper limit of the volume at "9" or "10" in this case, the setter 173 sets the volume of sound output from the speaker 130 at "8".

Figure 5C:
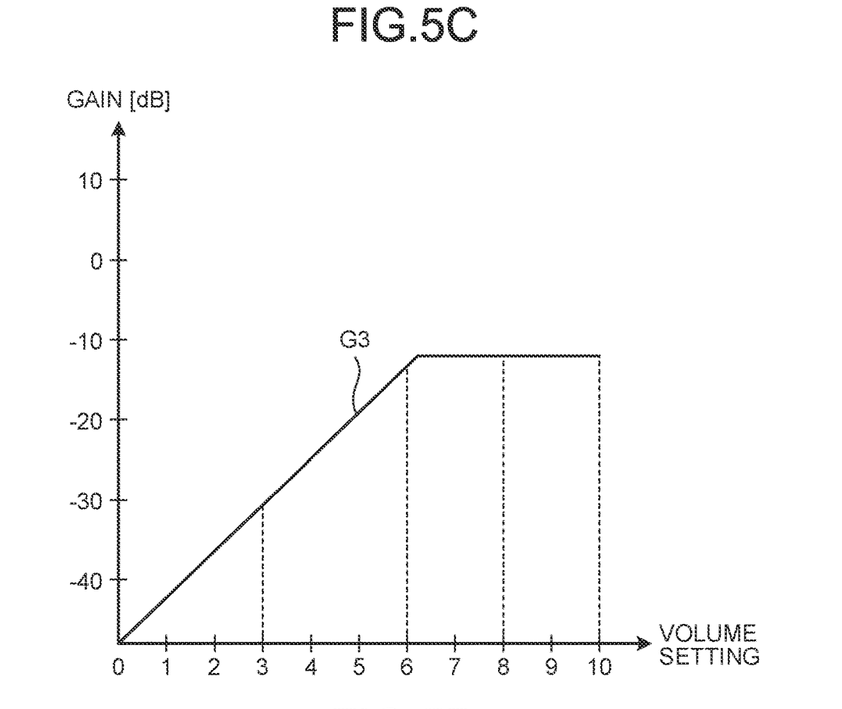
FIG. 5C is a diagram for describing changes in the volume upper limit according to the embodiment.

FIG. 5C is a graph G3 illustrating changes in the volume when the setter 173 sets the volume upper limit at "6". That is, when it is determined that the signal strength is "−80 to −90 dBm", the upper limit of the volume is changed between "0" and "6" inclusive as illustrated in the graph G3. If the user sets the upper limit of the volume at "7" or above in this case, the setter 173 sets the volume of sound output from the speaker 130 at "6".

Figure 5D:
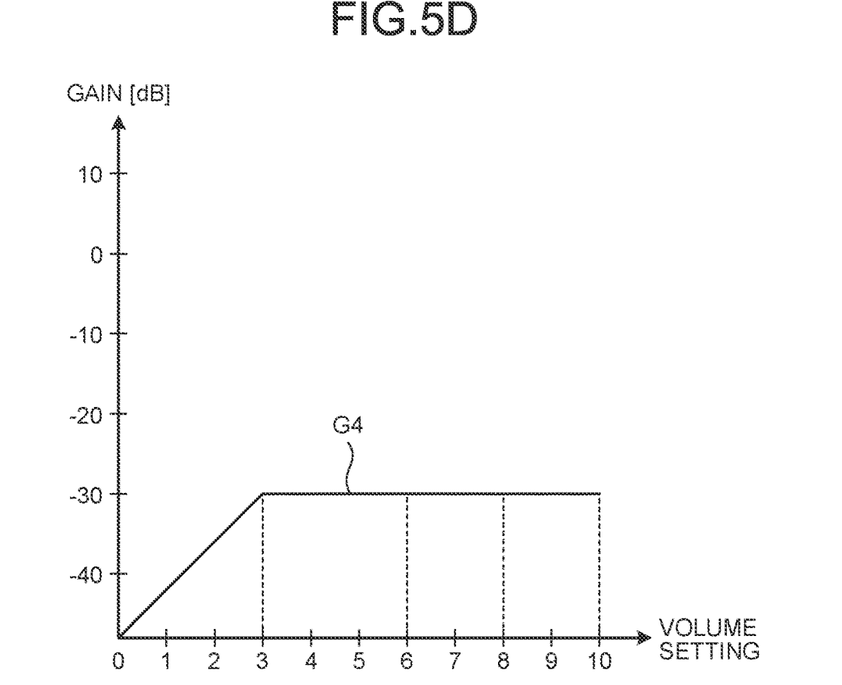
FIG. 5D is a diagram for describing changes in the volume upper limit according to the embodiment.

FIG. 5D is a graph G3 illustrating changes in the volume when the setter 173 sets the volume upper limit at "3". That is, when it is determined that the signal strength is "−80 dBm or greater", the upper limit of the volume is changed between "0" and "3" inclusive as illustrated in the graph G4. If the user sets the upper limit of the volume at "4" or above in this case, the setter 173 sets the volume of sound output from the speaker 130 at "3".

The setter 173 may dynamically control the volume upper limit while a voice call signal is received. In this case, while a voice call signal is received, the determiner 172 periodically determines strength of a proximity notification signal. The storage controller 175 periodically updates the proximity station list stored in the storage 160 in response to results of the determination. Then, the setter 173 may control the upper limit of the volume in accordance with the periodically updated proximity station list.

Figure 6:
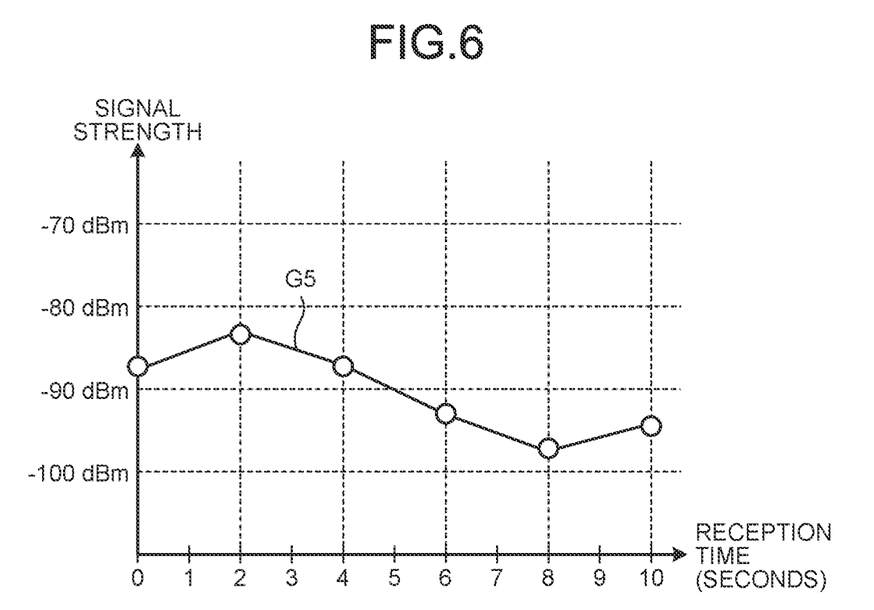
FIG. 6 is a diagram for describing a method of dynamically setting an upper limit of volume.

FIG. 6 is a diagram for describing a method of dynamically setting the upper limit of the volume. FIG. 6 is a graph G5 illustrating changes in the signal strength of a proximity notification signal for ten seconds. In FIG. 6, the horizontal axis represents time, and the vertical axis represents signal strength.

For example, the determiner 172 determines the signal strength of a received proximity notification signal at intervals of two seconds. The determiner 172 determines that the signal strength is "−80 to −90 dBm" from zero seconds until five seconds. In this case, the volume is changed as illustrated in the graph G3 in FIG. 5C. That is, the setter 173 sets the upper limit of the volume at "6" from zero seconds until five seconds. The determiner 172 determines that the signal strength is "−90 to −100 dBm" from six seconds until ten seconds. In this case, the volume is changed as illustrated in the graph G2 in FIG. 5B. That is, the setter 173 sets the upper limit of the volume at "8" from six seconds until ten seconds.

In specific, if the volume is set at "9" in the example illustrated in FIG. 6, the volume is set at "6" from zero seconds when a voice call signal is received until five seconds and at "8" from six seconds until ten seconds. When the reception of the voice call signal ends, the volume setting returns to "9".

Refer to FIG. 2 again. The output controller 174 outputs sound from the speaker 130. The output controller 174 outputs, from the speaker 130, sound relating to the voice call signal received by the second antenna 111b. The output controller 174 outputs the sound from the speaker while respecting the volume upper limit set by the setter 173.

The storage controller 175 correlates the ID of the terminal device with the signal strength determined by the determiner 172 and stores the ID and the signal strength as the proximity station list in the storage 160. The storage controller 175 updates the proximity station list stored in the storage 160.

The communication controller 176 controls communications carried out via the first communicator 110a and the second communicator 110b. The communication controller 176 exercises such control that the first communicator 110a broadcasts a proximity notification signal to which the ID for identifying the terminal device 100 is added. The communication controller 176 exercises such control that the first communicator 110a receives a proximity notification signal to which the ID for identifying another terminal device is added. The communication controller 176 exercises such control that the second communicator 110b sends a voice call signal to the base station device 200. The communication controller 176 exercises such control that the second communicator 110b receives a voice call signal from the base station device 200.

Sending Procedure in Terminal Device

Figure 7:
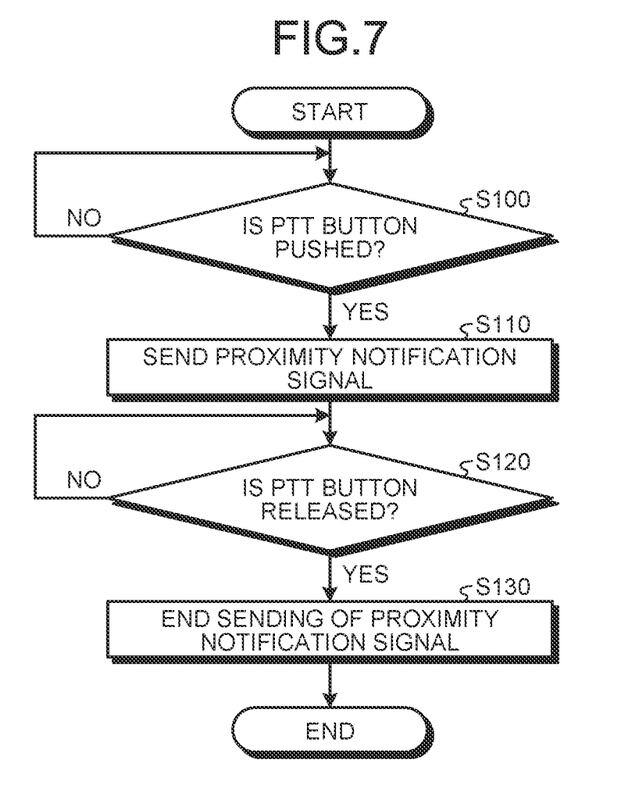
FIG. 7 is a flowchart illustrating an example procedure of sending a proximity radio signal in the terminal device according to the embodiment.

With reference to FIG. 7, a procedure of sending a proximity notification signal in the terminal device according to the embodiment will be described. FIG. 7 is a flowchart illustrating an example procedure of sending a proximity notification signal in the terminal device according to the embodiment.

First, the controller 170 determines whether the PTT button is pushed (step S100). If it is determined that the PTT button is pushed (Yes at step S100), the procedure proceeds to step S110. If it is determined that the PTT button is not pushed (No at step S100), the procedure repeats the process at step S100.

In the case of Yes at step S100, the controller 170 broadcasts a proximity notification signal (step S110). In specific, the communication controller 176 exercises such control that the first communicator 110a broadcasts a proximity notification signal to which the ID for identifying the terminal device 100 is added.

The controller 170 determines whether the PTT button is released (step S120). If it is determined that the PTT button is released (Yes at step S120), the procedure proceeds to step S130. If it is determined that the PTT button is not released (No at step S120), the procedure repeats the process at step S120.

In the case of Yes at step S120, the controller 170 ends the sending of the proximity notification signal (step S130). In specific, the communication controller 176 exercises such control that the first communicator 110a ends the sending of the proximity notification signal. This ends the procedure in FIG. 7.

Receiving Procedure in Terminal Device

Figure 8:
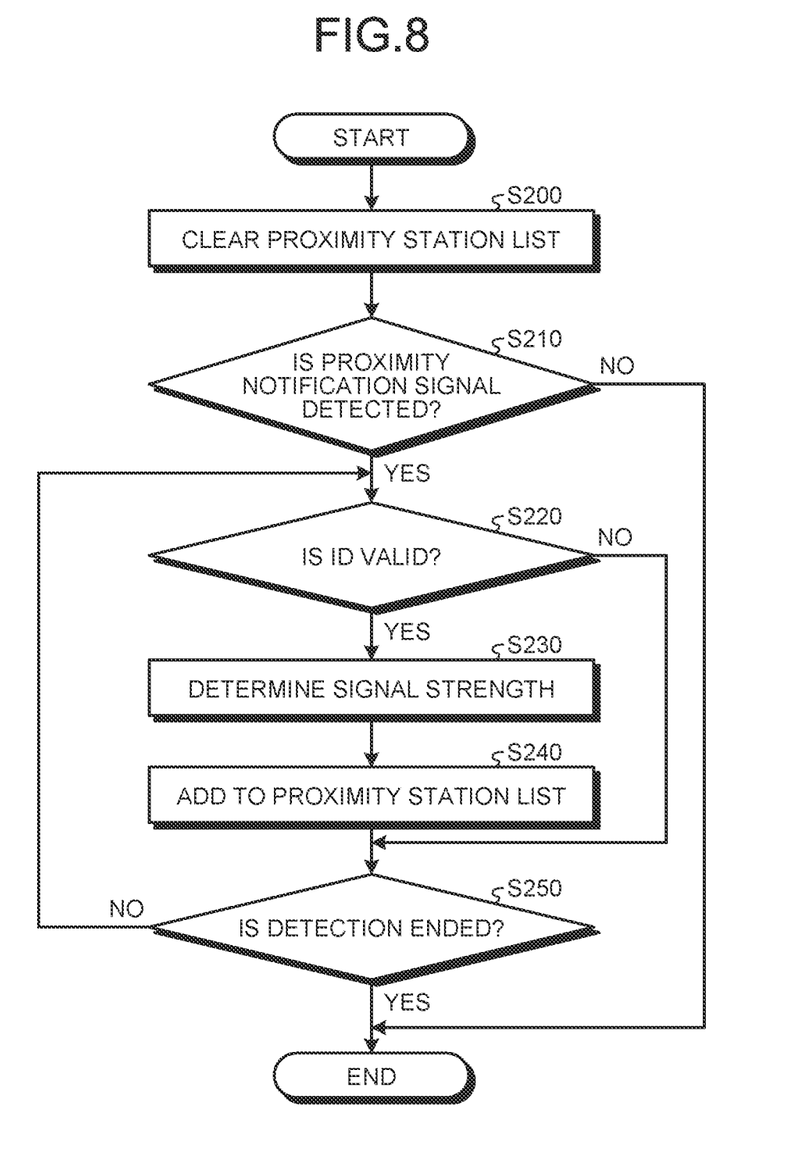
FIG. 8 is a flowchart illustrating an example procedure of receiving a proximity radio signal in the terminal device according to the embodiment.

With reference to FIG. 8, a procedure of receiving a proximity notification signal in the terminal device according to the embodiment will be described. FIG. 8 is a flowchart illustrating an example procedure of receiving a proximity notification signal in the terminal device according to the embodiment.

The flowchart in FIG. 8 illustrates an example procedure of starting reception and updating the proximity station list stored in the storage.

First, the controller 170 starts waiting for a call and then clears the proximity station list (step S200). In specific, the storage controller 175 updates the proximity station list stored in the storage 160 so that the proximity station list is in a cleared state where no terminal ID of another terminal device or signal strength is stored. The procedure then proceeds to step S210.

The controller 170 determines whether a proximity notification signal is detected (step S210). In specific, the detector 171 determines whether a proximity notification signal received by the first communicator 110a is detected. If it is determined that a proximity notification signal is detected (Yes at step S210), the procedure proceeds to step S220. If it is determined that no proximity notification signal is detected (No at step S210), the procedure in FIG. 8 ends.

In the case of Yes at step S210, the controller 170 determines whether the terminal ID contained in the proximity notification signal is a valid terminal ID (step S220). In specific, the determiner 172 determines whether the terminal ID contained in the proximity notification signal is an ID of a terminal device belonging to the same group making a group call.

In the case of Yes at step S220, the controller 170 determines the signal strength of the proximity notification signal (step S230). In specific, the determiner 172 determines the signal strength of the proximity notification signal. The procedure then proceeds to step S240.

The controller 170 adds the detected terminal ID to the proximity station list (step S240). In specific, the storage controller 175 correlates the detected ID of the terminal device with the determined signal strength of the proximity notification signal and adds the ID and the signal strength to the proximity station list. The procedure then proceeds to step S250.

The controller 170 determines whether to end the detection (step S250). In specific, if not detecting another proximity notification signal, the detector 171 ends the detection. If it is determined to end the detection (Yes at step S250), the procedure in FIG. 8 ends. If it is determined to continue the detection (No at step S250), the procedure proceeds to step S220.

Controlling Procedure of Volume Upper Limit

Figure 9:
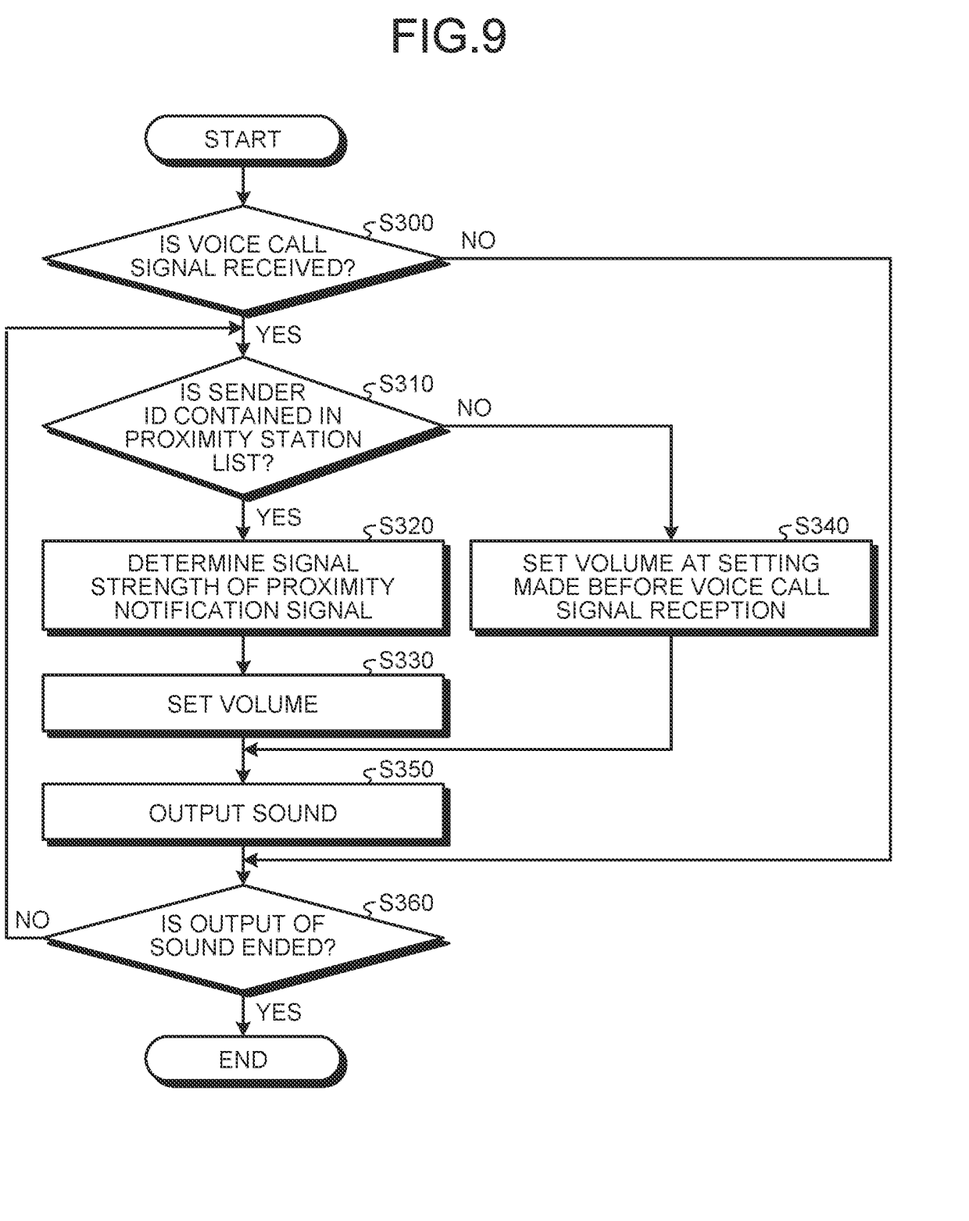
FIG. 9 is a flowchart illustrating an example procedure of controlling the volume upper limit at the time of receiving a proximity radio signal in the terminal device according to the embodiment.

With reference to FIG. 9, a procedure of controlling the volume upper limit at the time of receiving a proximity notification signal in the terminal device according to the embodiment will be described. FIG. 9 is a flowchart illustrating an example procedure of controlling the volume upper limit at the time of receiving a proximity notification signal in the terminal device according to the embodiment.

The procedure in FIG. 9 is carried out on the assumption that the procedure in the flowchart illustrated in FIG. 8 has been already carried out and that the proximity station list has been stored in the storage 160.

The controller 170 determines whether a voice call signal is received (step S300). In specific, the communication controller 176 determines whether the second communicator 110b receives a voice call signal from the base station device 200. If it is determined that a voice call signal is received (Yes at step S300), the procedure proceeds to step S310. If it is determined that no voice call signal is received (No at step S300), the procedure proceeds to step S360.

In the case of Yes at step S300, the controller 170 determines whether the ID of the terminal device serving as the sender is contained in the proximity station list (step S310). In specific, the setter 173 determines whether the terminal ID of the sender is contained in the proximity station list stored in the storage 160. If it is determined that the terminal ID of the sender is contained in the proximity station list (Yes at step S310), the procedure proceeds to step S320. If it is determined that the terminal ID of the sender is not contained in the proximity station list (No at step S310), the procedure proceeds to step S340.

In the case of Yes at step S310, the controller 170 determines the signal strength of the proximity notification signal (step S320). In specific, the setter 173 determines the signal strength of the proximity notification signal sent by the terminal device serving as the sender on the basis of the proximity station list stored in the storage 160. The procedure then proceeds to step S330.

The controller 170 sets the volume of sound output from the speaker 130 (step S330). In specific, the setter 173 sets the upper limit of the volume of the sound output from the speaker 130 on the basis of the signal strength of the proximity notification signal received from the terminal device serving as the sender. The procedure then proceeds to step S350.

In the case of No at step S310, the controller 170 sets the volume at setting made before the voice call signal is received (step S340). In specific, the setter 173 sets the volume of the sound output from the speaker 130 at volume setting made preliminarily. The procedure then proceeds to step S350.

The controller 170 outputs sound relating to the received voice call signal from the speaker 130 (step S350). In specific, the output controller 174 exercises such control that the volume does not exceed the set volume upper limit and outputs the sound relating to the voice call signal from the speaker 130. The procedure then proceeds to step S360.

The controller 170 determines whether to end the output of the sound (step S360). In specific, when the second communicator 110b ends the reception of the voice call signal, the communication controller 176 determines to end the sound output. If it is determined to end the sound output (Yes at step S360), the procedure in FIG. 9 ends. If it is determined to continue the sound output (No at step S360), the procedure proceeds to step S310.

As described above, in the present embodiment, when the sending terminal device (sending station) is located close to the receiving terminal device (receiving station) in making a group call or the like, the receiving terminal device controls the volume of sound output from the speaker so that the sound is not collected by the sending terminal device. Thus, the present embodiment can reduce occurrence of howls and can properly control the volume so that the user of the receiving terminal device can clearly hear sound.

First Modification

As described above, in the present embodiment, when the sending terminal device 100 is located close to the receiving terminal device 100, the receiving terminal device 100 lowers the volume of output sound to reduce occurrence of howls. It is assumed that sound output at a lowered volume may be difficult to hear clearly depending on the environment.

When sound is output at a predetermined volume or below, the storage controller 175 may record sound relating to the voice call signal in the storage 160. In this case, after ending a call, the user can replay the sound recorded in the storage 160 at a desired volume. When the storage controller 175 records the sound relating to the voice call signal in the storage 160, the output controller 174 may automatically replay the sound at a volume set in the terminal device 100 after the recording ends.

With this configuration, the user does not fail to hear the contents of the call and can thus properly understand the contents of the call.

Second Modification

In a group call, sound sent from the sending terminal device 100 is output simultaneously to a plurality of receiving terminal devices 100. If the receiving terminal devices 100 are located close to one another at this time, the waveforms of output sound can overlap, causing the volume to be amplified, in comparison with the case of a single receiving terminal device 100. Thus, even if each of the receiving terminal devices 100 lowers the volume, the sound is produced at a high volume as a whole, and howls may occur.

When the sending terminal device 100 is located close to the receiving terminal devices 100, the output controller 174 of each of the receiving terminal devices 100 may randomly set time between zero milliseconds and 500 milliseconds inclusive and delay sound output timing by the set time. This can prevent the waveforms of the sound output from the receiving terminal devices 100 from overlapping and can thus prevent the volume from being amplified.

When the sending terminal device 100 is located close to the receiving terminal devices 100, the output controller 174 of each of the receiving terminal devices 100 may output the sound while inverting the phase of the waveform with a probability of 1/2. This causes the waveforms of the sound output from the receiving terminal devices 100 to cancel one another and can thus prevent the volume from being amplified.

According to the present disclosure, with the terminal device, occurrence of howls can be reduced, and sound output can be properly controlled so that the user of the terminal device can clearly hear sound from the terminal device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device comprising:
a first communicator configured to carry out short-distance radio communications with a terminal device;
a second communicator configured to carry out long-distance radio communications with the terminal device;
a detector configured to detect an identifier from a reception signal received by the first communicator, the identifier being used for identifying the terminal device;
a determiner configured to determine signal strength of the reception signal detected by the detector;
a storage configured to store information relating to the terminal device and the signal strength;
a storage controller configured to exercise such control that the identifier and the signal strength are correlated with each other and stored in the storage as a proximity station list;
a setter configured to, upon reception of a voice call signal at the second communicator and upon determination that an identifier of a terminal device serving as a sender of the voice call signal is contained in the proximity station list stored in the storage, set a volume upper limit of output sound of the voice call signal depending on the signal strength correlated with the identifier contained in the proximity station list, the output sound being output from a speaker; and
an output controller configured to exercise such control that volume of the output sound of the voice call signal does not exceed the volume upper limit.

2. The terminal device according to claim 1, wherein
the determiner determines signal strength of the reception signal while the voice call signal is received, and
the setter sets a volume upper limit of the output sound depending on the signal strength determined by the determiner while the voice call signal is received.

3. The terminal device according to claim 1, wherein, upon setting of the volume upper limit at a predetermined threshold or below by the setter, the storage controller stores sound data relating to the voice call signal in the storage.

4. The terminal device according to claim 1, wherein, with a plurality of other terminal devices located in a vicinity of the terminal device, the output controller controls timing for outputting the output sound from the speaker.

5. A control method comprising:
detecting an identifier from a reception signal received from a terminal device, the identifier being used for identifying the terminal device;
determining signal strength of the reception signal received from the terminal device;
correlating the determined signal strength with the identifier and storing the determined signal strength and the identifier as a proximity station list;
upon reception of a voice call signal and upon determination that an identifier of a terminal device serving as a sender of the voice call signal is contained in the proximity station list, setting a volume upper limit of output sound of the voice call signal depending on the signal strength correlated with the identifier contained in the proximity station list, the output sound being output from a speaker; and
exercising such control that volume of the output sound of the voice call signal does not exceed the volume upper limit.

* * * * *